Oct. 29, 1968     M. B. RASMUSSON     3,407,755
FROZEN STICK-CONFECTION MACHINE
Filed Oct. 16, 1967     6 Sheets-Sheet 1

INVENTOR.
MARLIN B. RASMUSSON
BY
Lothrop & West
ATTORNEYS

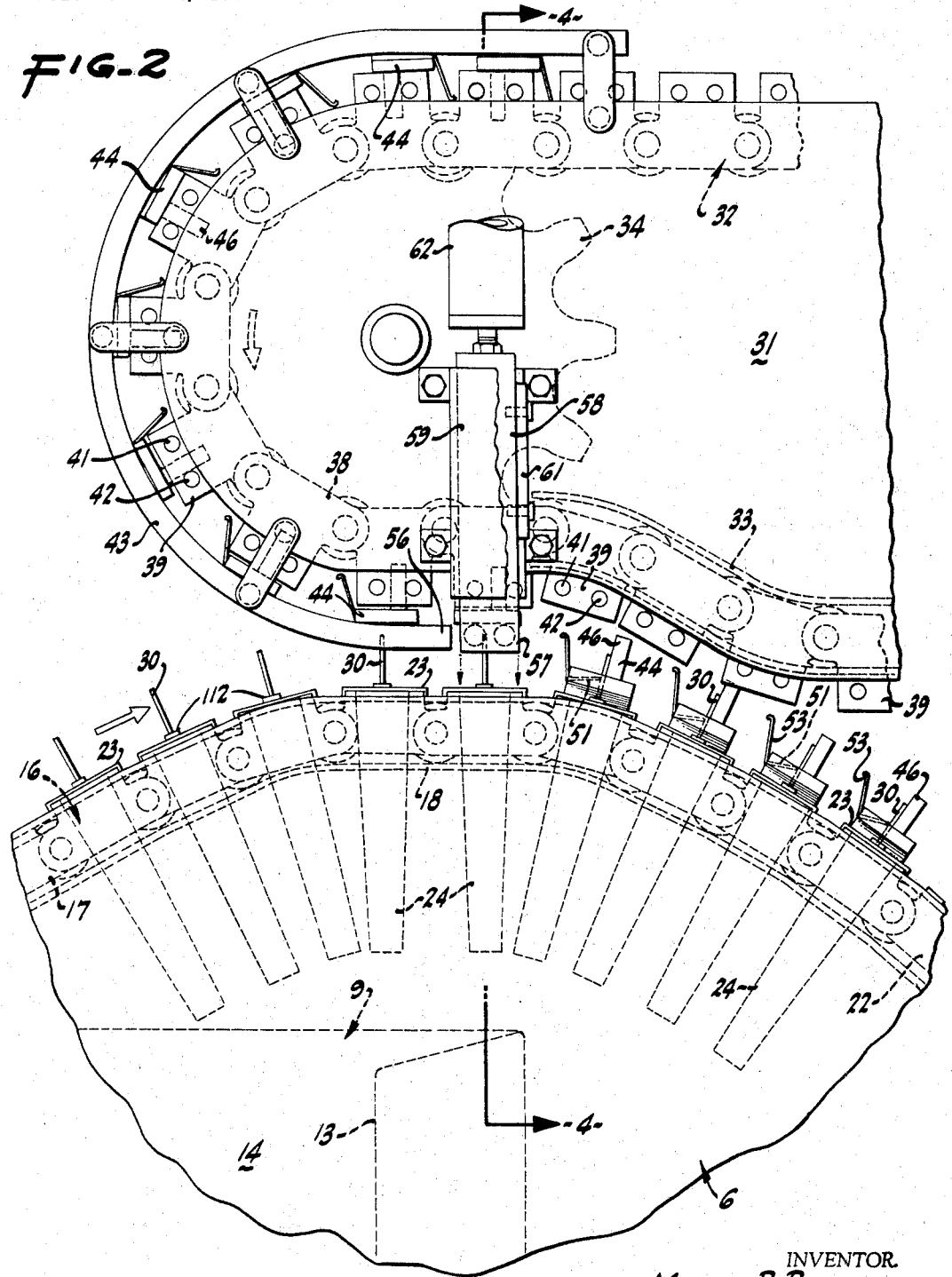

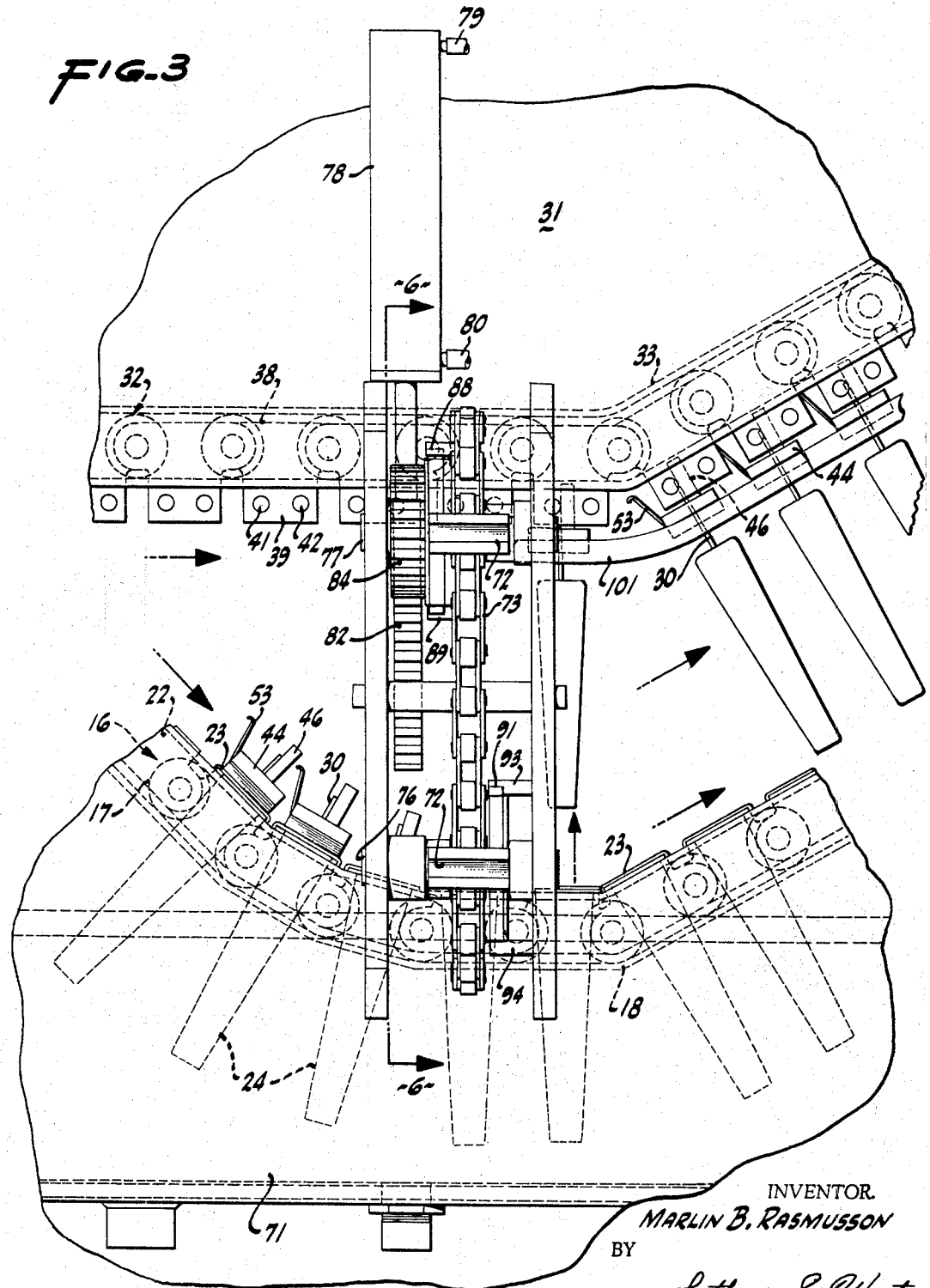

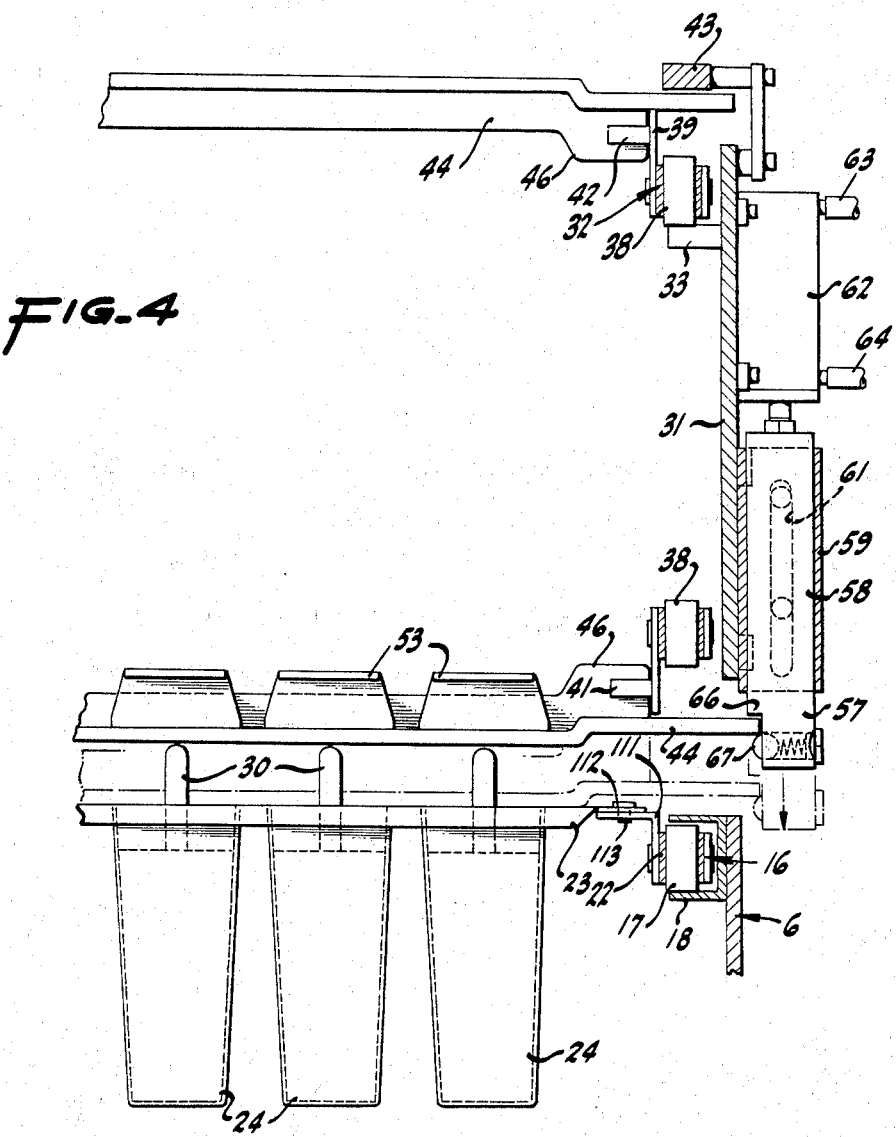
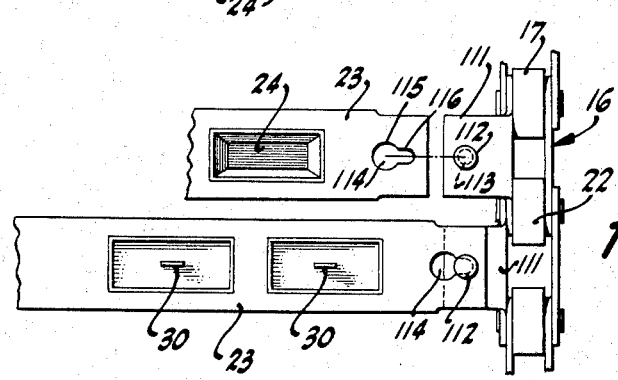

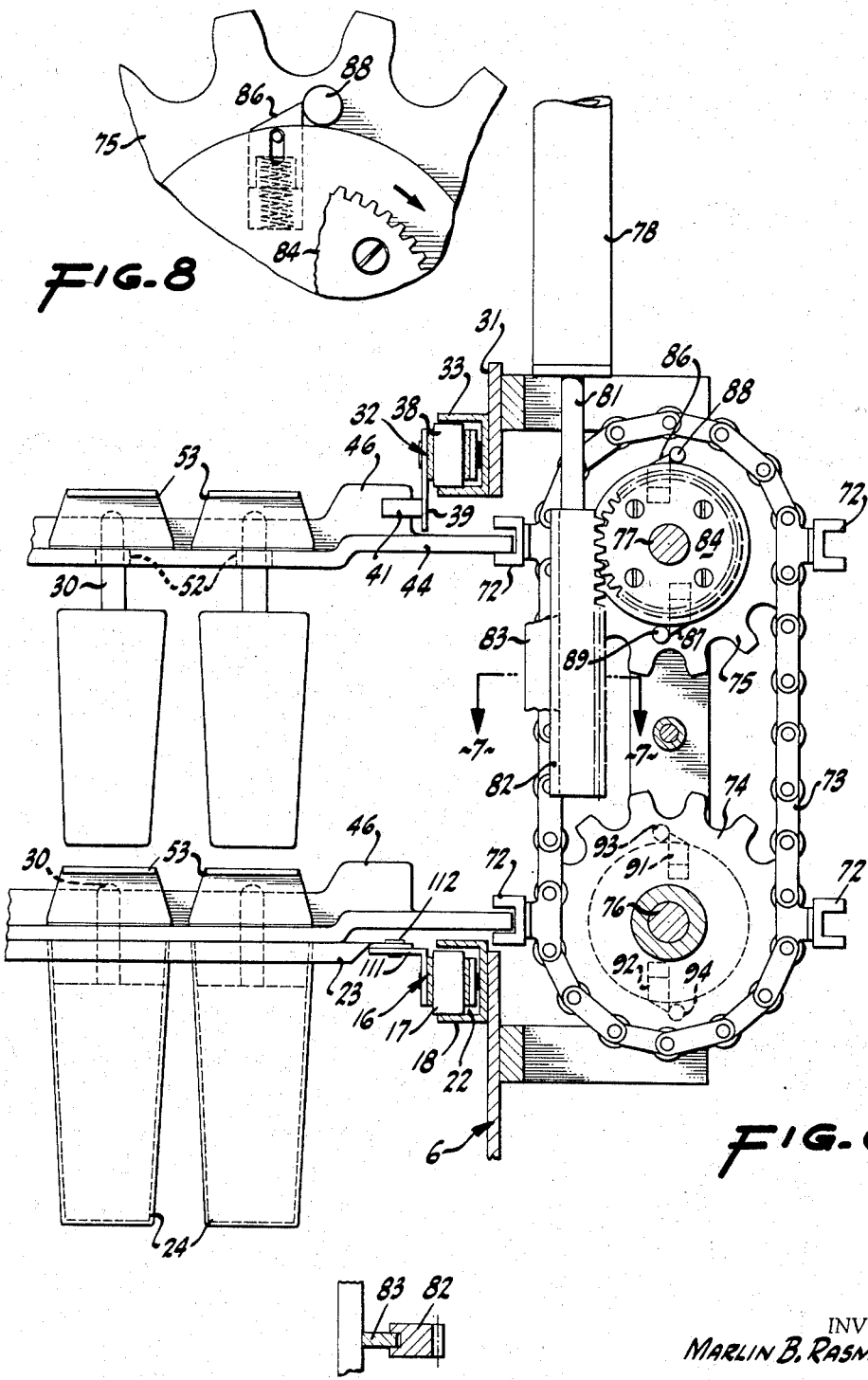

United States Patent Office 3,407,755
Patented Oct. 29, 1968

3,407,755
FROZEN STICK-CONFECTION MACHINE
Marlin B. Rasmussen, 3220 Marconi Ave.,
Sacramento, Calif. 95821
Filed Oct. 16, 1967, Ser. No. 675,384
6 Claims. (Cl. 107—8)

ABSTRACT OF THE DISCLOSURE

A frozen stick-confection machine has a primary conveyor intermittently advancing a confection mold through a brine tank for freezing an upright stick into the mold contents and subsequently subjecting the mold to a defrosting temperature at a defrosting station. A secondary conveyor synchronized with the primary conveyor engages a gripper with the stick, and a unidirectionally operating lifting member lifts the gripper, the stick and the attached confection from the primary conveyor to the secondary conveyor from which the stick and the confection are discharged, and the conveyors repeat their cycle.

---

My invention relates to means for producing serially and in quantity frozen confections usually of water ice, juice or ice cream mix, the confections being united with a handle or a stick, usually of wood, and being packaged for sale in individual or group form.

A related device is shown in my patent entitled "Frozen Confection Machine" No. 3,031,978 issued May 1, 1962.

In the manufacture of frozen stick-confections a part of the process involves the freezing of the edible portion on and in connection with a holding stick, the freezing operation taking place in a forming mold subjected to the heat transfer medium. The stick-confection is subsequently separated from the forming mold by an increase in temperature. This operation is relatively critical in that the entire confection must be fully freed from the mold in order to avoid physical destruction of the attractive shape and appearance of the confection, yet the superficial thawing must not be done too severely for remelting of the frozen confection is both uneconomical and undesirable from the standpoint of shape, appearance and the like. On the other hand, if the removal or thawing is not done uniformly and quickly, some of the confections may be broken and the production process may be unduly slowed, thus destroying some commercial values. The thawing, sometimes termed "defrosting," operation is one which consumes a relatively large amount of time with respect to the other operations accomplished by the mechanism and hence is critical to the machine as a whole.

It is therefore an object of my invention to provide a frozen stick-confection machine effective not only to freeze the confection onto a stick but also to remove the confection from its forming mold in a highly acceptable and satisfactory manner.

Another object of the invention is to provide a frozen stick-confection machine in which the defrosting or confection removing operation is carried out with sufficient alacrity as to permit the remainder of the machine to function at a high rate of production.

Another object of the invention is to provide a frozen stick-confection machine in which the over-all size, particularly the length, of the machine is reduced over prior practice.

An additional object of the invention is mechanically to improve the portions of the machine particularly concerned with the defrosting or confection and mold separating operation.

Another object of the invention is to provide a frozen stick-confection machine in which the operation, although intermittent, ensues with considerable smoothness; that is, low accelerations, in order to reduce wracking or jolting of the machine.

Another object of the invention is in general to provide an improved frozen stick-confection machine.

Other objects of the invention, together with the foregoing, are attained in the embodiment of the frozen stick-confection machine described in the accompanying description and illustrated in the accompanying drawings, in which:

FIGURE 2 is a fragmentary side elevation showing a portion of the bar transfer structure of the machine with some of the side covering removed;

FIGURE 3 is a fragmentary side elevation showing a portion of the defrosting section of the machine with some of the side covering removed;

FIGURE 4 is a view in cross section to the scale of FIGURE 3, the plane of section being indicated by the line 4—4 of FIGURE 2;

FIGURE 5 is a plan of a portion of a conveyor mechanism with one confection mold plate in position and another confection mold plate detached;

FIGURE 6 is a cross section, the plane of which is indicated by the line 6—6 of FIGURE 3;

FIGURE 7 is a detail showing a portion of the mechanism in cross section, the plane of which is indicated by the line 7—7 of FIGURE 6;

FIGURE 8 is a fragmentary view showing a portion of a pawl and ratchet clutch, portions of the figure being broken away;

Figure 1:
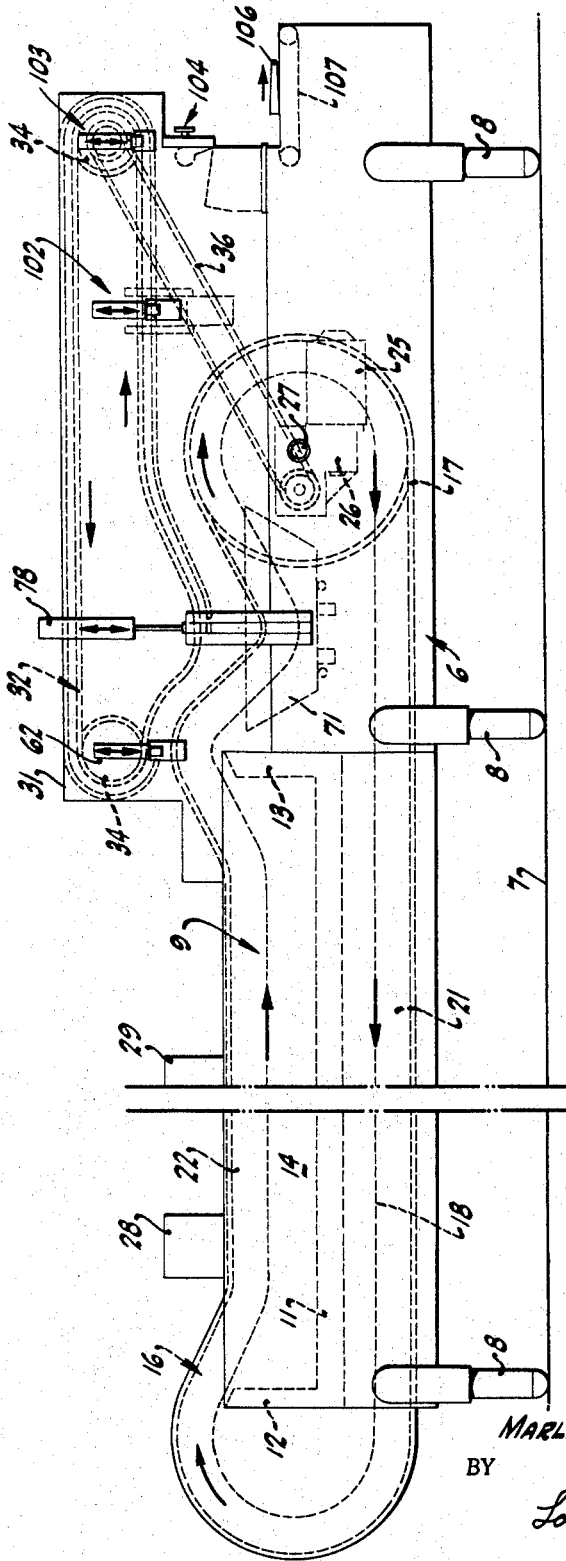
FIGURE 1 is a side elevation of a frozen stick-confection machine constructed pursuant to the invention, certain portions being shown diagrammatically and one portion being broken away to reduce the size of the figure.

In a successful embodiment of this invention there is provided a main framework 6 designed to rest on a supporting floor 7 through a number of adjustable supporting legs 8 so that the main frame can be maintained at a level attitude. On the main frame, which is made up of a number of shapes, angles and plates in the customary fashion, is a cooling or heat transfer element in the nature of a brine tank 9. This tank has a bottom 11, end walls 12 and 13 and a pair of side walls 14 to leave the top entirely open. It is customarily filled with brine to a set level, the brine being held at a desired low temperature by refrigeration apparatus, not shown.

Adapted to be mounted on the frame and to operate in connection with the brine tank 9 and other instrumentalities is a primary conveyor 16. This is of the customary closed loop, articulated belt type and includes a pair of side chains 17 in appropriate guides 18 on the opposite frame 6. Since the entire machine is generally symmetrical about a vertical, longitudinal plane, only one side is illustrated and described, it being understood that the mechanisms are duplicated in mirror symmetry. The primary conveyor is arranged so that its lower, return run 21 is relatively straight but its upper, laden run 22 is disposed in an undulatory path. The initial portion of the upper run is curved by portions of the guides 18 in such a fashion as to provide an entering down ramp leading into the brine tank. The upper run is then guided through the brine tank at a lower level to an upwardly inclined portion leading out of the brine tank. The guides 18 are then steeply inclined downwardly and finally steeply upwardly again to lead the conveyor chains around return and drive sprockets.

The two side chains 17 of the primary conveyor are spanned by a plurality of mold plates 23 extending transversely. Each mold plate carries a transverse series or plurality of substantially identical confection molds 24 depending therefrom. The level of the confection molds is such that much of their lower portion extends downwardly into the brine in the brine tank as the upper run of the conveyor advances therethrough. Preferably the primary conveyor is advanced by a drive motor 25 and appropriate interconnecting intermittent-drive mechanism 26 joined to the drive sprocket axle 27. The mold plates 23 all advance at the same time but in an intermittent fashion so that they proceed through the brine tank in a number of successive impulses or steps.

Mounted on the frame 6 in a location above the molds 24 and at the beginning of the horizontal upper portion of the conveyor run is a feeder 28 or filler of any suitable sort having the capacity of depositing in the individual confection molds 24 a regulated or measured supply of liquid to be frozen. The feeder 28 or filler forms no part of the present invention and hence is illustrated merely in a diagrammatic fashion representing any one of several different kinds of feeders or fillers that can equally well be employed.

The molds with the material to be frozen therein advance intermittently with the molds partly immersed in the liquid in the brine tank. At an intermediate position of advance when the contents are partially frozen a stick inserter 29 mounted on the main frame 6 is effective to plunge a stick 30 into the material within each mold. The inserted stick is sustained substantially in its vertical, inserted position by the partly frozen mold filling and as the primary conveyor advances is eventually frozen solidly into and with the material in the confection mold 24.

When adequate time has transpired to ensure the solid freezing of the materials within the confection molds 24, they rise intermittently out of the brine tank to a relatively high, intermediate point in the upper run travel of the primary conveyor. At this point in their advancement, the frozen confections with the sticks extending upwardly therefrom are provided with stick-engaging mechanisms.

Mounted on the frame 6 is a superstructure 31 forming part of the main frame and serving to support a secondary conveyor 32. This portion of the machine is also symmetrical about a longitudinal, central plane, so but one side is generally shown and described. The secondary conveyor is an endless chain device carried on opposite sides in suitable guides 33 and is trained around sprockets 34 driven by a chain 36 from the drive mechanism 26. The secondary conveyor operates intermittently, exactly in synchronism and in registry with the primary conveyor.

The secondary conveyor chain is characterized by links 38 having vertical plates 39 thereon from each of which a pair of transversely extending pins 41 and 42 projects.

Following the contour of a part of the secondary conveyor are curved guide tracks 43 to confine and slidingly support the ends of gripper bars 44 which when inverted rest upon the chain links. Each of the gripper bars at its opposite ends has a transversely extending, vertical fin 46 designed to fit loosely between adjacent pins 41 and 42. As the secondary conveyor chain is advanced the gripper bars are advanced intermittently therewith, but the fit between the fin 46 and the pins 41 and 42 is such that the gripper bars can be entirely detached by dropping downwardly from the chains.

Across its width each of the gripper bars 44 has a number of spring clamps 51 of the sort shown in my above-identified patent. Each clamp is effective to engage a corresponding stick 30 extending through an appropriate aperture 52 providing a passage through the gripper bar. The arrangement is such that when a stick 30 enters through the aperture 52 toward the spring retainer or clamp 51 the gripper or clamp 51 swings away, but when a retrograde or withdrawal movement of the stick 30 is attempted the gripper or clamp 51 tightly engages with the relatively soft, usually wood, material of the stick 30. The clamp 51 prevents extraction of the stick unless some outside force is first effective upon the release plate 53 to move the gripper away from the stick and to release the stick completely.

As shown particularly in FIGURE 2, the arrangement is such that after a confection mold plate has moved out of the brine tank and is approximately in a horizontal position in the upper run of the primary conveyor with the sticks 30 extending upwardly, the secondary conveyor 32 brings a gripper bar 44 around the guides 43 and into registry with a subjacent mold plate, each gripper clamp 51 being substantially above one of the subjacent sticks. As the secondary conveyor advances intermittently the ends of a gripper bar 44 are moved to ride off of the lower forward end 56 of the guides 43 (FIGURE 4) and to lodge on plungers 57. Each plunger is formed at the lower end of a block 58 mounted to reciprocate in a guide 59 on the superstructure 31. The guide is prevented from rotating by means of a keyway 61 and key and is impelled by an actuating cylinder 62 having connections 63 and 64 to a suitable control. The end of the plunger 57 has a shoulder 66 designed to ride over the end of the gripper bar 44 and is provided with a spring-pressed detent ball 67, the force of the spring being sufficient to snap over and to sustain the gripper bar substantially against the shoulder 66 but being insufficient to preclude downward release of the gripper bar under a superior force.

The block 58 is in its uppermost position when the leading gripper bar rides onto the plunger 57 and stops there due to the intermittent conveyor motion. The timing of the mechanism is such that the cylinder 62 is then actuated to drive the gripper bar downwardly from the secondary conveyor onto the subjacent upstanding sticks protruding from the registering confection mold plate on the primary conveyor. The gripper bar is readily detached since the fins 46 simply slide downwardly from beneath the horizontally directed pins 41 and 42, and the secondary conveyor advances through the next portion of its travel devoid of the gripper bar. When the cylinder 62 is reversed the detent ball 67 readily depresses and the plunger 57 returns to its initial upper position ready for a subsequent cycle. The grippers 51 are left in engagement with the sticks frozen into the confections in the confection mold.

The confection molds with the gripper bars engaging the sticks therein then descend intermittently in a relatively steep path in the upper run of the primary conveyor. The confection molds are moved downwardly into a defrosting tank 71 mounted on the main frame 6 and supplied with water at an appropriate temperature to defrost the entering confection molds and free the otherwise frozen confections from the walls of the molds.

When the confection molds have been in the defrosting tank 71 a sufficient length of time they have been advanced intermittently to a position substantially as shown in FIGURES 1 and 3 in which the mold plates are substantially level or horizontal. In this position a mold plate is well retained, as shown in FIGURE 6, against vertical dislodgment inasmuch as it is confined by the adjacent portion of the guide 18. In this position of advance the otherwise free end of the associated extractor bar 44 has advanced into a specially positioned receiving channel 72. The receiving channel 72 is typical of a plurality of such channels open at their opposite ends and designed to have a sliding fit around the ends of the extractor bars. Each channel 72 is particularly mounted on a lifter chain 73 trained around a pair of sprockets 74 and 75 connected to the main frame 6 and the superstructure 31 by appropriate mounting shafts 76 and 77.

Since the machine operates intermittently, means are provided for intermittently operating the lifter chain 73 at the proper time. For that reason, a driving cylinder 78 is mounted on the superstructure. Actuating fluid under properly timed control is furnished the cylinder through conduits 79 (FIGURE 3) and 80. The cylinder carries a plunger 81 at its lower end connected to a rack 82. To confine the rack to translation, a key 83 extends into it from the framework. The rack 82 is in mesh with a driving pinion 84 mounted freely on the shaft 77 and having a pair of spring-projected angular pawls 86 and 87 (FIGURE 8) mounted therewith. The pawls when projected are in position to ride behind and engage horizontally projecting pins 88 and 89 extending from a side face of the sprocket 75.

When the cylinder 78 is actuated to lift the ram 81 and the rack 82, the gear 84 is driven clockwise, as seen in FIGURE 6. The extended pawls are in abutment with the pins 88 and 89 and so rotate the sprocket 75 sufficiently to advance the chain 73 a measured amount. The lowermost, engaged channel 72, as seen in FIGURE 6, advances to the upper position, as seen in FIGURE 6. The length of the stroke of the rack is adjusted so that at the conclusion of the stroke another one of the channels 72 is exactly in position to receive a succeeding one of the gripper bars.

The chain 73 is advanced unidirectionally and to provide for the return of the rack 82 the connections to the cylinder 78 are reversed. The rack 82 is then driven downwardly to original position, rotating the drive pinion 84 counterclockwise, as seen in FIGURE 6, with the pawls 86 and 87 retracting so as to pass the pins 88 and 89 and snapping behind them ready for the next cycle.

To make sure that the channels 72 never move in a retrograde direction under the weight of any of the parts being sustained, the lower sprocket 74 is connected to pawls 91 and 92 designed to abut against pins 93 and 94 fixed on the framework. Thus, while the sprocket 74 can easily advance in a clockwise direction since the pawls readily retract, the pawls 91 and 92 when projected interengage behind the pins 93 and 94 to prevent any retrograde movement and hold the channels 72 against retraction from their designed locations. Since the channels always advance in one direction when in engagement with the gripper bars, no time need be allotted for a return stroke. The machine cycle is thus speeded up.

With the mold plate in a position within the guide channel 18, the operation of the cylinder 78 in lifting the channel 72 also lifts the extractor bar to withdraw the sticks and the thawed confections from their molds and to lift all of them from a lower position into an upper position.

In the upper position, particularly as shown in FIGURE 3, the extractor bar with the sticks and withdrawn confections depending therefrom is intermittently advanced from the then stationary channels 72 onto a guide 101 which is an interrupted continuation of the guide 43 and which generally follows the upward and then horizontal portions of the secondary conveyor.

In this fashion the defrosted or partially thawed confections are removed from their molds and are advanced in a hanging condition on the secondary conveyor. The mold plates and molds themselves travel around the return driving wheel of the primary conveyor and are washed in inverted position on the lower, return run 21 and are then brought back to the point of beginning for recycling. The extractor bars with the confections depending therefrom advance in a substantially horizontal path. If desired, they can encounter a coating mechanism 102 or the like for putting a chocolate coating or a similar dress on the exposed confections. Since the coating mechanism 102 is standard, it is not described in detail.

The advancing confections on the lower run of the secondary conveyor finally come to a release mechanism 103 which preferably includes a transverse stationary rod, as shown in my Patent 3,031,978. The rod is in position to be abutted by the release plates 53 at a proper time in their advance and to rock the grippers so that there is no longer any restraint on the sticks 30. The depending confections and their sticks fall by gravity into a bagging mechanism 104 of a standard type, the bagged confections 106 then being discharged from the machine on a discharge conveyor 107.

It is of importance to have a firm interconnection between the mold plates 23 and the conveyor chains 17 to which they are attached, yet to be able to remove the mold plates and their attendant molds in order to replace them with mold plates having molds of different shape or size or to repair them or to give them an extraordinary cleaning. The interconnection is conveniently made, as shown in FIGURES 4 and 5, by having each conveyor chain 17 provided with a number of angle plates 111, each of which has an upstanding headed button 112 with a reduced shank 113. In one end at least of the mold plate 23 there is provided an opening 114 having one portion 115 of large enough diameter to slip over the head 112 and also having another portion 116 too small to pass over the head 112 but big enough to accommodate the shank 113. A construction of this sort can be provided on both sides of the mechanism, but it is preferred to provide it on one side only, the other side being provided with the standard type of fasteners 112 but having only the larger opening 115. There is sufficient lateral flexibility in the chains when running so that they tend to keep the parts in assembled position as shown in FIGURE 5. One chain 17 when stationary can easily be deflected laterally far enough to move the head 112 from its customary position over the reduced portion 116 into a temporary position over the enlarged portion 115. This end portion of the mold plate can then be lifted off, as can the enlarged portion at the other end, and the mold plate 23 is then entirely detached. For normal running, however, the chain 17 maintains its normal path and the head 112 overlies the reduced portion 116 to prevent detachment.

Figure 9:
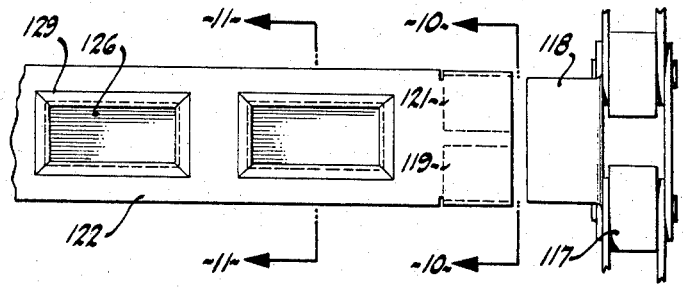
FIGURE 9 is a view comparable to FIGURE 5 showing in plan a fragment of a modified form of confection mold plate.
Figure 10:
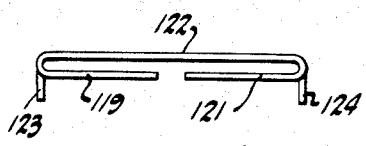
FIGURE 10 is a cross section, the plane of which is indicated by the line 10—10 of FIGURE 9.
Figure 11:
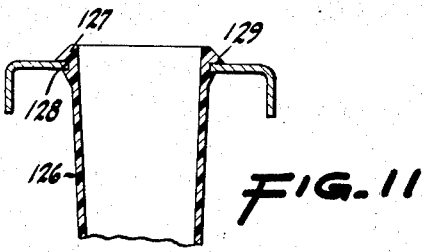
FIGURE 11 is a cross section, the plane of which is indicated by the line 11—11 of FIGURE 9.
Figure 12:
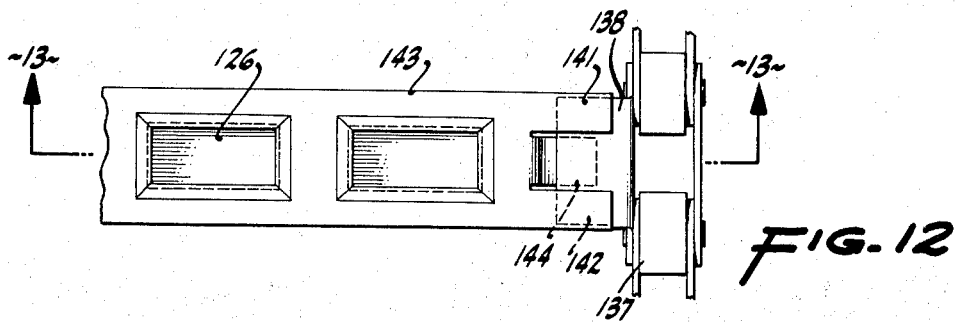
FIGURE 12 is a plan similar to FIGURE 9 and showing a modified form of confection mold plate in position.
Figure 13:
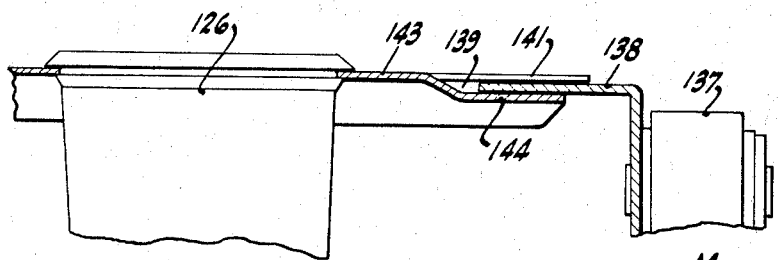
FIGURE 13 is a cross section to an enlarged scale, the plane of section being indicated by the line 13—13 of FIGURE 12.

In FIGURES 9–11 a somewhat similar arrangement is provided with an alternative interconnection. In this instance the side chain 117 has an angle plate 118 extending therefrom and is receivable within the inturned flanges 119 and 121 of a tubular-ended mold plate 122. The plate 122 is preferably fabricated from a sheet and the central portion is stiffened by downturned flanges 123 and 124. The flanges 119 and 121 are somewhat resilient so that the tubular end is a close sliding fit on the angle plate 118. It is possible to flex the stationary chain sufficiently so that an appropriate interengagement can be made, there being freedom of movement of the chain 117 with respect to its guide. When the parts have been frictionally urged into telescoping relationship, the normal operation of the chain keeps the parts together.

The mold plate 122 is especially designed to receive a mold of a different characteritsic. The regular molds are normally of stainless steel welded to stainless steel mold plates. In this instance, the mold 126 is preferably of a deformable, usually plastic, material inert to the mix that is put into it for freezing and to the brine on the outside and which preferably is a good conductor of heat. The mold is provided with a thickened upper flange 127 having a peripheral groove 128 which can be sprung over and frictionally will engage the margins 129 of the corresponding openings in the mold plate 122.

A further modified form of interconnecting arrangement includes a chain 137 having a plate 138 extending therefrom very much like the plate 118, but in this instance extending into a socket 139 defined between spaced bifurcated ends 141 and 142 on the mold plate 143 and overlying a spring-like prong 144 extending downwardly and between the bifurcations 141 and 142. The prong 144 is of sufficient strength so that there is a tight frictional engagement between the bifurcated ends of the mold plate and the chain plate 138, although by deflecting the stationary chain transversely the parts can be disengaged.

What is claimed is:

1. A frozen stick-confection machine comprising a frame, a freezing mechanism on said frame, a defrosting mechanism on said frame, a primary conveyor on said frame and having a top run extending through said freezing mechanism and then through said defrosting mechanism, a confection mold on said primary conveyor and adapted to sustain a substantially upright stick embedded within at least partly frozen confection within said mold, means for advancing said primary conveyor intermittently, a secondary conveyor on said frame and having a bottom run extending adjacent said top run, means for advancing said secondary conveyor in synchronism with said primary conveyor, a stick holder, means for interengaging said stick holder and said secondary conveyor to position said stick holder above said confection mold, means for transferring said stick holder from said secondary conveyor into engagement with said stick on said primary conveyor, means in the vicinity of said defrosting mechanism for engaging said stick holder and moving said stick holder from said primary conveyor back to said secondary conveyor, said engaging means including a closed loop chain having a vertical run, a socket on said chain adapted to support said stick holder, and means operating in time with said primary conveyor for advancing said vertical run to lift said socket from a point adjacent said top run to a point adjacent said bottom run.

2. A frozen stick-confection machine as in claim 1 in which said stick holder has a blade-like end and said socket is a block mounted on said chain and having a horizontal groove adapted to receive said end.

3. A frozen stick-confection machine as in claim 1 in which said means for advancing said vertical run is a reciprocating cylinder driving said chain through a ratchet and pawl mechanism.

4. A frozen stick-confection machine as in claim 3 in which means are provided for preventing retrograde movement of said vertical run.

5. A frozen stick-confection machine as in claim 1 in which said freezing mechanism includes a brine tank, said defrosting mechanism includes a hot water tank, said upper run follows a path upwardly out of said brine tank then downwardly into said defrosting tank and then upwardly out of said defrosting tank thus defining a sinuous section having a low point in said defrosting tank, said lower run approximately parallels said sinuous section, said stick holder transferring means is adjacent the initial high point of said sinuous section and said engaging and moving means is adjacent said low point.

6. A frozen stick-confection machine as in claim 1 in which said socket is lowered from said point adjacent said bottom run to said point adjacent said top run in a path different than the path in which said socket moves during the advance of said vertical run to lift said socket.

References Cited

UNITED STATES PATENTS

| | | | |
|---|---|---|---|
| 1,960,456 | 5/1934 | Robb | 107—8 |
| 3,031,978 | 5/1962 | Rasmusson | 107—8 |

WALTER A. SCHEEL, *Primary Examiner.*

J. SHEA, *Assistant Examiner.*